US009232217B2

(12) United States Patent
Argyropoulos et al.

(10) Patent No.: US 9,232,217 B2
(45) Date of Patent: Jan. 5, 2016

(54) METHOD AND APPARATUS FOR OBJECTIVE VIDEO QUALITY ASSESSMENT BASED ON CONTINUOUS ESTIMATES OF PACKET LOSS VISIBILITY

(75) Inventors: Savvas Argyropoulos, Berlin (DE); Bernhard Feiten, Berlin (DE); Marie-Neige Garcia, Berlin (DE); Peter List, Eppertshausen (DE); Alexander Raake, Berlin (DE)

(73) Assignee: DEUTSCHE TELEKOM AG, Bonn (DE)

(*) Notice: Subject to any disclaimer, the term of this patent is extended or adjusted under 35 U.S.C. 154(b) by 355 days.

(21) Appl. No.: 13/991,907

(22) PCT Filed: Sep. 2, 2011

(86) PCT No.: PCT/EP2011/065192
§ 371 (c)(1),
(2), (4) Date: Jul. 5, 2013

(87) PCT Pub. No.: WO2012/076203
PCT Pub. Date: Jun. 14, 2012

(65) Prior Publication Data
US 2013/0271668 A1  Oct. 17, 2013

(30) Foreign Application Priority Data

Dec. 10, 2010 (EP) .................................... 10194580

(51) Int. Cl.
H04N 17/00  (2006.01)
H04N 19/44  (2014.01)
H04N 19/89  (2014.01)
H04N 19/85  (2014.01)

(52) U.S. Cl.
CPC ............. *H04N 17/004* (2013.01); *H04N 19/44* (2014.11); *H04N 19/85* (2014.11); *H04N 19/89* (2014.11)

(58) Field of Classification Search
None
See application file for complete search history.

(56) References Cited

U.S. PATENT DOCUMENTS

2010/0110199 A1   5/2010  Winkler et al.
2013/0044224 A1*  2/2013  Liao et al. ..................... 348/192

FOREIGN PATENT DOCUMENTS

EP   2106153 A1    9/2009
JP   2006033722 A  2/2006
JP   2008301026 A  12/2008

OTHER PUBLICATIONS

K. Yamagishi and T. Hayashi, "Parametric Packet-Layer Model for Monitoring Video Quality of IPTV Services," in Proc. of IEEE Int. Conf. on Communications, Dec. 2008.

(Continued)

*Primary Examiner* — Dave Czekaj
*Assistant Examiner* — Nam Pham
(74) *Attorney, Agent, or Firm* — Leydig, Voit & Mayer, Ltd.

(57) ABSTRACT

A method for assessing the quality of a transmitted video signal sequence at a receiver side includes: capturing the input video bit stream; extracting at least one feature or a set of features; determining the continuous probability of visibility for each packet loss event which occurred within a specific time interval; and employing the continuous probability of packet loss visibility as a weighting factor of the at least one feature or set of features extracted from the video bit stream to calculate an estimate of the overall quality, Q, of the transmitted video sequence.

11 Claims, 5 Drawing Sheets

(56) References Cited

OTHER PUBLICATIONS

M. Garcia and A. Raake, "Parametric packet-layer video quality model for IPTV," Int. Conf. on Information Science, Signal Processing and their Applications (ISSPA), Kuala-Lumpur, May 2010.

S. Kanumuri, P. C. Cosman, A. R. Reibman, V. A. Vaishampayan, "Modeling packet-loss visibility in MPEG-2 video," IEEE Trans. On Mulitmedia, vol. 8, No. 2, Apr. 2004, pp. 341-355.

S. Kanumuri, S. B. Subramanian, P. C. Cosman, A. R. Reibman, "Predicting H.264 packet loss visibility using a generalized linear model," Image Processing, 2006 IEEE International conference on, IEEE, PI, Oct. 1, 2006, pp. 2245-2248, XP031049119, ISBN: 978-1-4244-0480-3.

T.L. Lin, S. Kanumuri, Y. Zhi, D. Poole, P.C. Cosman, and A.R. Reibman, ,,A versatile model for packet loss visibility and its application to packet prioritization, IEEE Trans. On Image Processing, vol. 19, No. 3, pp. 722-735, Mar. 2010.

N. Staelens et al., "Viqid: A no-reference bit stream-based visual quality impairment detector," Proceedings of the 2010 second international workshop on quality of multimedia experience (QOMEX 2010), Trondheim, Norway, IEEE, Piscataway, NJ, USA, Jun. 21, 2010, pp. 206-211, XP031712774.

Y. J. Liang, J. G. Apostolopoulos, and B. Girod, "Analysis of packet loss for compressed video: effect of burst losses and correlation between error frames," IEEE Transactions on Circuits and Systems for Video Technology, IEEE Service Center, Piscataway, NJ, US, vol. 18, No. 7, Jul. 1, 2008, pp. 861-874, XP011226407, ISSN: 1051-8215, DOI: 10.1109/TCSVT.2008.923139.

T. Wiegand, G. J. Sullivan, G. Bjontegaard, and A. Luthra, "Overview of the H.264/AVC video coding standard," IEEE Trans. on Circuits and Systems for Video Technology, vol. 13, No. 7, Jul. 2003.

M. Naccari, M. Tagliasacchi, and S. Tubaro, "No-reference video quality monitoring for H.264/AVC coded video," IEEE Trans. on Multimedia, vol. 11, No. 5, pp. 932-946, Aug. 2009.

Fuzheng Yang et al: "No-Reference Quality Assessment for Networked Video via Primary Analysis of Bit Stream", IEEE Transactions on circuits and systems for video technology, IEEE service center, Piscataway, NJ, US, vol. 20, No. 11, Nov. 1, 2010, pp. 1544-1554, XP011319799, ISSN: 1051-8215.

Savvas Argyropoulos et al: "No-reference bit stream model for video quality assessment of h.264/AVC video based on packet loss visibility," acoustic, speech and signal processing (ICASSP), 2011 IEEE international conference on, IEEE, May 22, 2011, pp. 1169-1172, XP032000951, DOI: 10.1109/ICASSP.2011.5946617, ISBN: 978-1-4577-0538-0.

Winkler S et al: "The Evolution of Video Quality Measurement: From PSNR to Hybrid Metrics," IEEE Transaction on broadcasting, IEEE service center, Piscataway, NJ, US, vol. 54, No. 3, Sep. 1, 2008, pp. 660-668, XP011229276, ISSN: 0018-9316, DOI: 10.1109/TBC.2008.2000733.

Mu Mu et al: "A Discrete perceptual impact evaluation quality assessment framework for IPTV services," Multimedia and expo (ICME), 2010 IEEE International conference on, IEEE, Piscataway, NJ, USA, Jul. 19, 2010, pp. 1505-1510, XP031761609, ISBN: 978-1-4244-7491-2.

Takahashi A. et al: "Standardization activities in the ITU for a QoE assessment of IPTV," IEEE Communications magazine, IEEE Service center, Piscataway, US, vol. 46, No. 2, Feb. 1, 2008, pp. 78-84, XP011206259, ISSN: 0163-6804.

\* cited by examiner

METHOD AND APPARATUS FOR OBJECTIVE VIDEO QUALITY ASSESSMENT BASED ON CONTINUOUS ESTIMATES OF PACKET LOSS VISIBILITY

CROSS-REFERENCE TO RELATED APPLICATIONS

This application is a U.S. National Phase application under 35 U.S.C. §371 of International Application No. PCT/EP2011/065192, filed on Sep. 2, 2011, and claims benefit to European Patent Application No. EP 10194580.6, filed on Dec. 10, 2010. The International application was published in English on Jun. 14, 2012 as WO 2012/076203 A1 under PCT Article 21(2).

FIELD

The present invention relates to a method and apparatus for video quality assessment based on the analysis of the visibility of packet losses that may occur during the transmission of a video sequence through an error-prone network.

BACKGROUND

The proliferation of video content delivery during recent years has necessitated the development of objective video quality assessment methods. It has become evident that network parameters which define the Quality of Service (QoS) are not sufficient to estimate the service quality perceived by the user, typically referred to as Quality of Experience (QoE).

Quality estimation methods commonly support a distinguished estimation of the quality related to the coding (compression, $Q_{cod}$) of the video signal and the quality due to packet loss during transmission ($Q_{trans}$). It is an inherent property of IP-networks that (mostly due to temporal overload at some point in the network) IP packets may be lost. Some of these losses may be almost invisible to the customer while others may cause severe degradation of the video quality. Even if countermeasures against these losses are part of an IPTV distribution system, these countermeasures can never guarantee an absolute remedy. For instance, a retransmission request may take too long, or the retransmitted packet itself might get lost. Therefore there is always a nonzero probability, that fragmentary bit streams are transmitted to the end user device. These in turn can cause visible or audible degradations in the reconstructed video. Measurement categories may therefore also include values to express the probability for losses. Such values may include the expression of a "packet loss rate" and the "burstiness of loss events".

For this purpose, parametric video quality models for IPTV applications have been developed which account for the distortion both due to compression and erroneous transmission (see, e.g., K. Yamagishi and T. Hayashi, "Parametric Packet-Layer Model for Monitoring Video Quality of IPTV Services," in Proc. of IEEE Int. Conf. on Communications, 2008 [1], or M. N. Garcia and A. Raake, "Parametric packet-layer video quality model for IPTV," Int. Conf. on Information Science, Signal Processing and their Applications (ISSPA), Kuala-Lumpur, May 2010 [2]).

However, purely header-based models cannot precisely cover the impact of network impairments on visual quality in terms of the spatio-temporal characteristics of the video sequence and the statistical properties of the packet losses. Thus, objective video quality assessment models should analyze the relationship between packet losses and visual degradation and factor in the fact that packet losses do not produce an equal amount of perceived degradation.

The problem of predicting packet loss visibility has been addressed in the literature only in terms of classification of packet losses in a binary manner: visible or invisible. In S. Kanumuri, P. C. Cosman, A. R. Reibman, V. A. Vaishampayan, "Modeling packet-loss visibility in MPEG-2 video," IEEE Trans. On Multimedia, vol. 8, no. 2, April 2004, pp. 341-355, a set of features was extracted from the MPEG-2 bitstream and two modeling approaches, a Generalized Linear Model (GLM) was used to estimate the relative number of viewers who detected an error, and a tree classifier to determine whether a packet loss results in a visible degradation. The former classification was extended for H.264/AVC video in S. Kanumuri, S. B. Subramanian, P. C. Cosman, A. R. Reibman, "Predicting H.264 packet loss visibility using a generalized linear model," in Proc. of IEEE Int. Conf. on Image Processing (ICIP), Atlanta, Ga., October 2006, in which the effect of dual packet losses was examined, and in T. L. Lin, S. Kanumuri, Y. Zhi, D. Poole, P. C. Cosman, and A. R Reibman, "A versatile model for packet loss visibility and its application to packet prioritization," IEEE Trans. on Image Processing, vol. 19, no. 3, pp. 722-735, March 2010, where the proposed framework was used for packet prioritization at the intermediate routers of a network.

Additionally, a no-reference bit stream-based decision tree classifier for CIF sequences was developed by N. Staelens et al., "Viqid: A no-reference bit stream-based visual quality impairment detector," in IEEE Workshop on Quality of Multimedia Experience, Trondheim, Norway, June 2010. Here, the effect of the packet loss pattern and length on the subjective quality still remains an open question. In Y. J. Liang, J. G. Apostolopoulos, and B. Girod, "Analysis of packet loss for compressed video: effect of burst losses and correlation between error frames," IEEE Trans. on Circuits and Systems for Video Technology, vol. 18, no. 7, pp. 861-874, July 2008, the effect of burst losses on the reconstructed video quality was analyzed and it was shown that a specific loss pattern produces a larger degradation than an equal number of isolated losses. Also, the correlation between error frames was considered in the modeling of the induced distortion. However, the algorithm was only tested on QCIF sequences and, thus, with a packetization scheme in which an individual frame is contained in one packet. Moreover, the impact on the subjective ratings was not tested.

SUMMARY

In an embodiment, the present invention provides a method for assessing the quality of a transmitted video signal sequence at a receiver side. The method includes: a) capturing the input video bit stream and supplying it to a video bit stream analyzer; b) extracting at least one feature or a set of features from the captured input video bit stream by the bit stream analyzer; c) supplying the at least one extracted feature or set of features to a packet loss visibility estimation module; d) determining, by the packet loss visibility estimation module employing the supplied extracted features of the video bit stream, the continuous probability of visibility for each packet loss event which occurred within a specific time interval; and e) employing the continuous probability of packet loss visibility, determined by the packet loss visibility estimation module, as a weighting factor of the at least one feature or set of features extracted from the video bit stream to calculate an estimate of the overall quality, Q, of the transmitted video sequence. Step (d) employs at least one bit stream feature selected from the group consisting of: frame type, average magnitude of motion vectors (AvgMv), average motion vector difference (AvgMvDiff), energy of residuals (ResEnergy), maximum number of partitions (MaxPartNr), number of non-decodable macroblocks (LostMbs), motion vector information (mv), and type of macroblocks (mb type). Step (e) combines the packet loss visibility estimate (V) with the determined magnitude of distortion (EstErr) and the computed total number of impaired pixels due to packet loss (ErrProp).

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
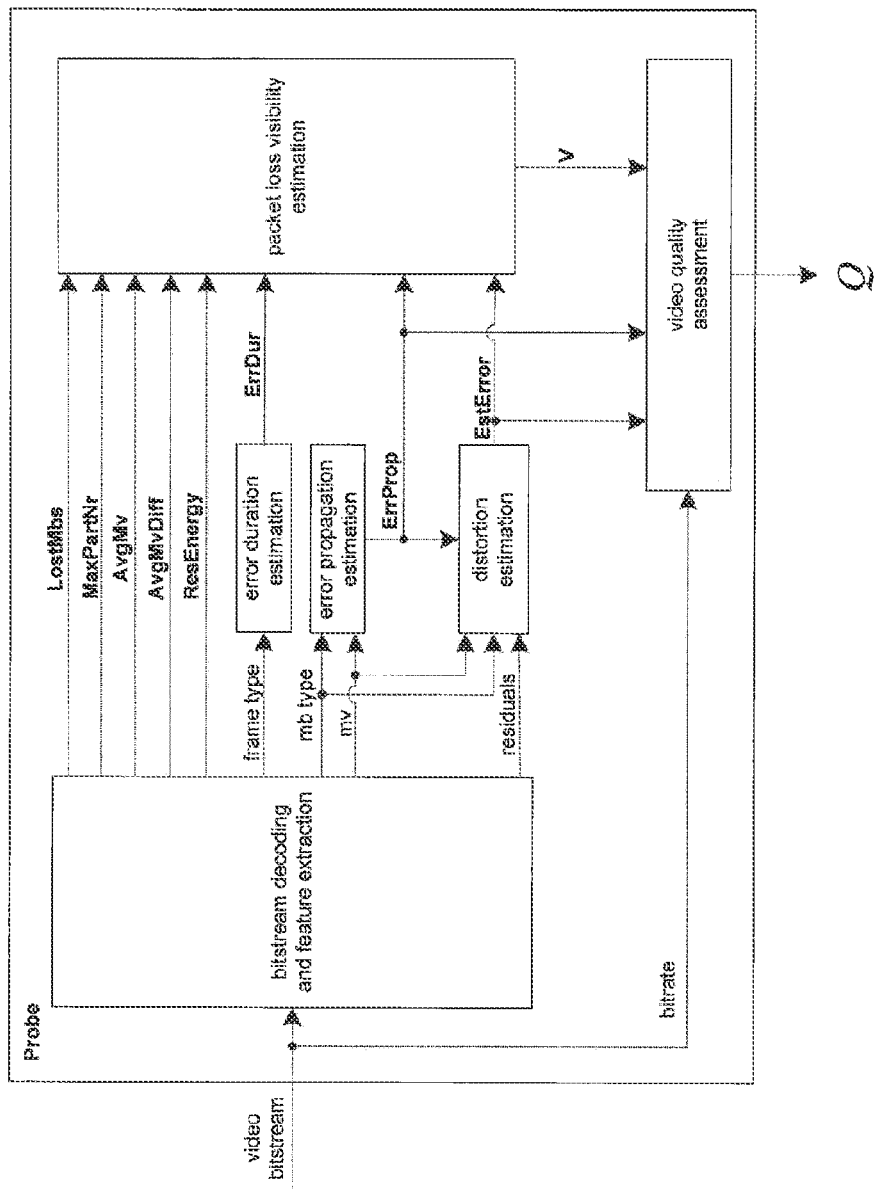
FIG. 1 shows the architecture of the proposed video quality assessment model.

Embodiments of the present invention provide a method and apparatus for the objective quality assessment of a video sequence.

The method and apparatus provide for the objective quality assessment of a video sequence based on at least one or a set of features extracted from the video bit stream and the prediction of continuous probabilistic estimates for the visibility of packet losses that may occur due to transmission of the video sequence over an error-prone network. Apparently, the method is a no-reference bit stream-based video quality assessment method, since it extracts information only from the received bit stream without the need for an explicit reference sequence.

According to a first aspect, an embodiment of the invention provides a method for assessing the quality of a transmitted video signal sequence at the receiver side, the method comprising the steps of:

a) capturing the input video bit stream and supplying it to a video bit stream analyzer;

b) extracting at least one feature or a set of features from the captured input video bit stream by the bit stream analyzer;

c) supplying the extracted feature or set of features to a packet loss visibility estimation module;

d) determining, by the packet loss visibility estimation module, the visibility of a packet loss occurred during transmission of the video signal by assigning a continuous estimate for each packet loss event occurred within a specific time interval;

e) combining the packet loss visibility estimate determined by the estimation module with the extracted at least one feature or set of features to assess the overall quality, Q, of the transmitted video signal sequence.

The feature extraction according to step (b) may be performed directly by partly decoding the video bit stream. Alternatively, the feature extraction according to step (b) is performed by full decoding of the video bit stream and by combining information from the reconstructed pixels of the video signal.

According to a preferred embodiment of the invention, step (e) additionally weights the extracted feature(s) to reflect that each packet loss produces unequally perceived degradations to the transmitted video signal sequence.

The at least one feature or set of features is selected from the group comprising: frame type, average magnitude of motion vectors (AvgMv), average motion vector difference (AvgMvDiff), energy of residuals (ResEnergy), maximum number of partitions (MaxPartNr), number of non-decodable macroblocks (LostMbs), motion vector information (mv), and type of macroblocks (mb type). According to a further preferred embodiment, a combination of all these features is used.

In a preferred embodiment, based on the extracted feature "frame type" the number of frames (ErrDur) degraded by a packet loss is determined.

The method further encompasses that a binary error propagation map is generated for each picture of the video signal sequence based on the motion vector information and the type of macroblocks.

Furthermore, based on the error propagation map and frame type information the number of frames (ErrDur) degraded by a packet loss may be determined.

According to a further preferred embodiment, based on the binary error propagation map the total number of impaired pixels due to packet loss (ErrProp) is computed.

It is further preferred that magnitude of distortion (EstErr) induced due to packet loss and error propagation is determined based on the motion vectors, the macroblock types, and the residuals.

The step (d) may be performed using a support vector regression technique by mapping the input feature vector to a high-dimensional feature space using a non-linear mapping function, and constructing a linear model in the feature space.

Furthermore, step (e) may combine the packet loss visibility estimate (V) with the determined magnitude of distortion (EstErr) and the computed total number of impaired pixels due to packet loss (ErrProp).

The method may further comprise between steps d) and e) the step of estimating the overall visible distortion generated by temporal pooling of all packet losses occurring within the video signal sequence.

According to a second aspect, an embodiment of the invention provides an apparatus for assessing the quality of a transmitted video signal sequence at the receiver side, the apparatus comprising:

a video bit stream analyzer receiving the captured input video bit stream, and configured for extracting at least one feature or a set of features from the captured input video bit stream;

a packet loss visibility estimation module receiving the extracted feature or set of features, the packet loss visibility estimation module configured for determining the visibility of a packet loss occurred during transmission of the video signal by assigning a continuous estimate for each packet loss event occurred within a specific time interval;

a combiner for combining the packet loss visibility estimate determined by the estimation module with the extracted at least one feature or set of features to assess the overall quality, Q, of the transmitted video signal sequence.

The video bit stream analyzer is configured to perform the feature extraction directly by partly decoding the video bit stream. Alternatively, the video bit stream analyzer is configured to perform the feature extraction by full decoding of the video bit stream and by combining information from the reconstructed pixels of the video signal.

According to a preferred embodiment of the invention, the combiner is configured to additionally weight the extracted feature(s) to reflect that each packet loss produces unequally perceived degradations to the transmitted video signal sequence.

According to the second aspect, the at least one feature or set of features is selected from the group comprising: frame type, average magnitude of motion vectors (AvgMv), average motion vector difference (AvgMvDiff), energy of residuals (ResEnergy), maximum number of partitions (MaxPartNr), number of non-decodable macroblocks (LostMbs), motion vector information (mv), and type of macroblocks (mb type). According to a further preferred embodiment, a combination of all these features is used.

In a preferred embodiment, the apparatus is configured to determine, based on the extracted feature "frame type", the number of frames (ErrDur) degraded by a packet loss.

According to a preferred embodiment, the apparatus comprises an error propagation estimator being configured to generate a binary error propagation map for each picture of the video signal sequence based on the motion vector information and the type of macroblocks.

Furthermore, based on the error propagation map and frame type information the number of frames (ErrDur) degraded by a packet loss may be determined.

According to a further preferred embodiment, the error propagation estimator is further configured to compute, based on the binary error propagation map, the total number of impaired pixels due to packet loss (ErrProp).

It is further preferred that the apparatus comprises a distortion estimator being configured to determine the magnitude of distortion (EstErr) induced due to packet loss and error propagation based on the extracted motion vectors, the extracted macroblock types, and the extracted residuals.

The packet loss visibility estimation module may be further configured to determine the visibility of the packet loss using a support vector regression technique by mapping the input feature vector to a high-dimensional feature space using a non-linear mapping function, and constructing a linear model in the feature space.

Furthermore, the combiner may further be configured to combine the packet loss visibility estimate (V) with the determined magnitude of distortion (EstErr) and the computed total number of impaired pixels due to packet loss (ErrProp).

The apparatus may further be configured to estimate the overall visible distortion generated by temporal pooling of all packet losses occurring within the video signal sequence prior to combining the packet loss visibility estimate determined by the estimation module with the extracted at least one feature or set of features.

The method and apparatus according to embodiments of the invention differentiate from the approaches proposed in the literature in at least three main points. First, the method is different from the parametric models ([1, 2]) since it exploits the information from the bitstream to determine the objective video quality and is not based on packet header information only. The extracted features from the bit stream enable the consideration of content dependency, the adaptation of the video quality measure to the spatio-temporal characteristics of the video sequences and take advantage of the properties of the human visual system (HVS) which are neglected in the parametric models.

Second, the packet loss visibility of each packet loss is not estimated in a binary fashion (visible or invisible) but rather with a continuous value which denotes how probable is the packet loss under investigation to result in a perceivable and detectable degradation of the video sequence. The granularity of the proposed method enables more accurate prediction of the visibility of packet losses due to network impairments. In contrast, all previously presented methods in the literature provide binary outputs for packet loss visibility estimation.

Third, all the aforementioned methods do not consider the effect of packet loss visibility on the perceived video quality; they only examine the visibility of packet losses based on features extracted from the received bit stream. However, in embodiments of the present invention, the output of the packet loss visibility classifier module is incorporated into the objective video quality assessment model to assess the quality of the bit stream. This method for video quality assessment explicitly exploits packet loss visibility estimation with continuous estimates for objective video quality assessment.

Other aspects, features, and advantages will be apparent from the summary above, as well as from the description that follows, including the figures and the claims.

The architecture of the video quality assessment model according to a preferred embodiment of the invention is depicted in FIG. 1. FIG. 1 depicts the block diagram of a preferred method and apparatus for the objective video quality assessment based on the estimation of the visibility of packet loss events. In particular, it is shown that it is a no-reference bit-stream based method which extracts or computes eight features from the received bit-stream to evaluate the perceptual impact of every packet loss. Subsequently, the extracted features and the predicted value for the visibility of the packet loss are used to assess the overall quality of the video bit stream.

At the receiver, a probe device captures the bit stream and extracts or computes a number of features that are utilized for the video quality assessment. The features are either extracted directly by partly decoding the bit stream or combining information from the reconstructed pixels (full decoding of the bit stream). Then, the extracted features are fed to the module which is responsible for determining the visibility of each packet loss event. This module assigns a continuous estimate of visibility for each packet loss event (isolated packet losses or combination of events) that occurs within a specific time duration. Subsequently, the probability estimate of the packet loss visibility module is combined with the previously extracted features to assess the overall quality of the sequence. Specifically, based on the probability estimates of the visibility of each packet loss, the extracted features are weighted in the final algorithm to reflect that every packet loss produces unequally perceived degradations to the video sequence. Finally, the probe device outputs the predicted value of video quality, Q.

Method for Feature Extraction and Computation from the Bit Stream

The following describes the features preferably extracted from the bit stream to determine the visibility of packet losses and the objective quality of the video sequences. It will be appreciated that in this example the analysis is based on streams encoded according to the H.264/AVC video coding standard (T. Wiegand, G. J. Sullivan, G. Bjontegaard, and A. Luthra, "Overview of the H.264/AVC video coding standard," IEEE Trans. on Circuits and Systems for Video Technology, vol. 13, no. 7, July 2003), but the method could be applied to any video coding standard with minor modifications for the computation of the corresponding features.

One of the properties that need to be computed for the estimation of the perceptual degradation caused by a packet loss is the "frame type" of all frames and in particular the frame affected by the loss. The possible values for the "frame type" property include "Intra-frame" or "Key-Frame" (below called I-frame), "Predicted-Frame" (below called P-frame) and "Bidirectional-Frame" (below called B-frame). Only I-frames can be decoded without referencing information of any prior frames. In contrary, P-frames depend on one or more predecessors called "reference frames", because the information transmitted for a P-frame mainly consists of the difference between the video-frame it describes and its references. Therefore, packet losses within an I-frame or its consecutive P-frames propagate into following frames, even if these following frames do not contain any lost packets themselves. Due to this mechanism, a single packet loss error may linger through long parts of a video sequence, until the next error free I-frame occurs. Errors in P-frames and particularly in I-frames may therefore have a high visibility. The same reference frame mechanism is true for B-frames, but, since B-frames in general do not serve as references themselves, an error in a B-frame will only cause degradation in this single frame.

Figure 2:
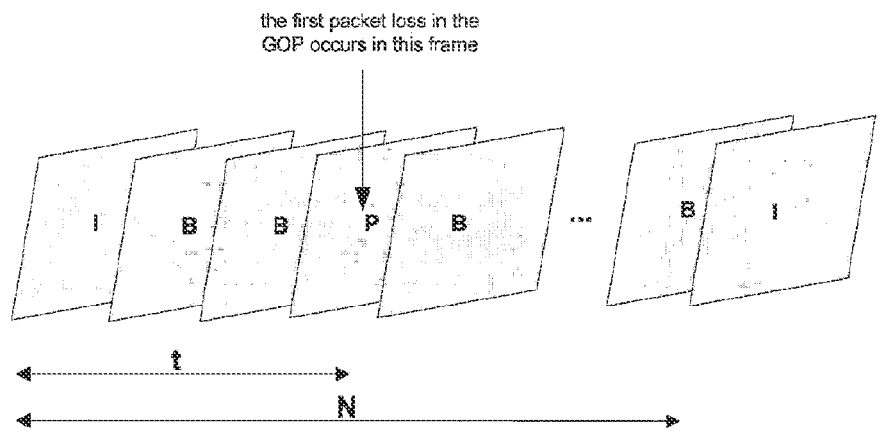
FIG. 2 shows how frames are organized in a "group-of-pictures" (GOP) for video encoding.

The chain of video frames between two successive I-frames is called "Group of Pictures" (GoP). In most of the cases P and B-frames in a GoP follow a more or less strict pattern like the typical GoP-pattern: "I, B, B, P, B, B, P . . . ". Let N denote the GOP-length, that is the distance between two successive I-frames. Then, if the first packet loss occurs t frames after the first I-frame of a specific GOP, the first feature that is extracted is the number of frames that are degraded due to the packet loss, called ErrDur. This property is computed as (see FIG. 2):

$$ErrDur = \begin{cases} N - t + 1, & \text{if frame type is } I \text{ or } P \\ 1, & \text{if frame type is } B \end{cases} \quad \text{Eq. (1)}$$

Thus, if the packet loss occurs in the first frame (which is an I-frame) then t=1, and the number of frames that are impaired by the packet loss is N, that is equal to the number of frames in the GOP.

Subsequently, the average magnitude of motion vectors, AvgMv, is preferably computed which reflects the mean motion vector in the horizontal and vertical directions of all macroblocks (mb) affected by the loss. Let $v_n = [v_{n,x}, v_{n,y}]$ denote the motion vector of the n-th macroblock in the frame in which the packet loss occurred. Then, the term AvgMv is computed as:

$$AvgMv = \frac{1}{L}\sqrt{\left(\sum_{l=1}^{L} v_{l,x}\right)^2 + \left(\sum_{l=1}^{L} v_{l,y}\right)^2} \quad \text{Eq. (2)}$$

where L is the cardinality of the set of the macroblocks that are lost in frame n due to the packet loss. Apparently, since the motion vector information for the lost macroblocks cannot be recovered, this information is estimated from their temporal neighbors. That is, for every missing macroblock, the motion vector information is recovered from the co-located macroblock in the previous correctly received frame.

Additionally, the average motion vector difference, AvgMvDiff, may be computed from the bit stream. In H.264/AVC, to exploit the redundancy among motion vectors, only the difference between the motion vector of a block and its predicted motion vector from neighboring macroblocks is included in the bit stream. This feature is extremely meaningful in sequences with predictable movement (e.g., panning), where the average motion may be large, but the motion vector differences encoded in the bit stream are small. Let $vd_n = [vd_{n,x}, vd_{n,y}]$ denote the motion vector difference of the n-th macroblock in the frame in which the packet loss occurred. Then, the term AvgMvDiff is computed as:

$$AvgMv = \frac{1}{L}\sqrt{\left(\sum_{l=1}^{L} vd_{l,x}\right)^2 + \left(\sum_{l=1}^{L} vd_{l,y}\right)^2} \quad \text{Eq. (3)}$$

where L is the cardinality of the set of the macroblocks that are lost in frame n due to the packet loss. Similarly to the case above, since the motion vector information for the lost macroblocks cannot be recovered, this information is estimated from their temporal neighbours. That is, for every missing macroblock, the motion vector information is recovered from the co-located macroblock in the previous correctly received frame.

Figure 3:
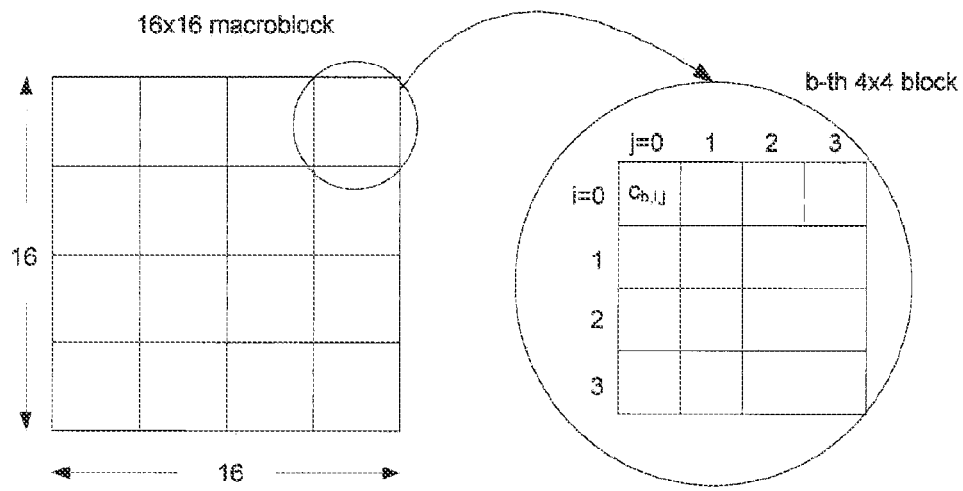
FIG. 3 shows the partitioning of macroblocks according to the H.264/AVC standard and the derivation of the transform coefficients after the application of the 4×4 integer transform.

Another feature that is preferably extracted from the received video bit stream is the energy of the residual, ResEnergy, which is contained in the missing macroblocks and is computed from the transform coefficients of the prediction error. Let $c_{b,i,j}$, b=0, . . . , 3, i=0, . . . , 3, and j=0, . . . , 3 denote the transform coefficient at the i-th row and j-column of the b-th 4×4 block of a macroblock (see FIG. 3). Then, the residual energy is computed as:

$$ResEnergy = \frac{1}{L}\sum_{l=1}^{L}\sum_{b=1}^{4}\sum_{i=0}^{3}\sum_{j=0}^{3} c_{b,i,j}^2 \quad \text{Eq. (4)}$$

where l and L are defined as above.

Another feature that may be extracted is the maximum number of partitions, called MaxPartNr, in the frame where the loss occurs. In H.264/AVC, each 16×16 macroblock can be further split in smaller blocks for the motion estimation process, i.e. blocks of size 16×8, 8×16, or 8×8. If the 8×8 partition size is chosen, each 8×8 partition may be further divided in sub-partitions of size 8×8, 8×4, 4×8, or 4×4 luma samples. Thus, the parameter MaxPartNr is equal to the maximum number of partitions of the correctly received macroblocks in the frame where the loss occurs. If all the macroblocks are erased (that is, if the whole frame is lost) then the parameter is derived from the previous received frame.

The sixth feature that is extracted from the received bit stream is the number of macroblocks that are non-decodable due to the packet loss and need to be concealed, called LostMbs below.

Additionally, based on the motion vector information and the type of macroblocks, a binary error propagation map may be generated for each picture, which denotes the pixels in each picture that are impacted by the packet loss(es) either due to the innovation error or due to the propagation of the error to the subsequent frames of the same GOP due to the predictive coding. Let I(x,y,k) denote the value of the binary error map at location (x,y) of the k-th frame, x=1, 2, . . . , H, and y=1, 2, . . . , W where H, W are the height and width of each frame of the video sequence, respectively. Also, k=1, ..., K, where K is the number of frames that contain impaired pixels due to the packet loss. The value for those pixels that are either impaired due to the packet loss or reference those areas and are likely to be erroneous is set to one, otherwise the value is set to zero. Thus:

$$I(x, y, k) = \begin{cases} 1, & \text{if pixel in position } (x, y) \text{ of frame } k \text{ is impaired} \\ 0, & \text{if pixel in position } (x, y) \text{ of frame } k \text{ is not impaired} \end{cases} \quad \text{Eq. (5)}$$

In other words, the value in the propagation map array is set to one for all pixels that are not identical between the original video sequence and the reconstructed image of the decoder within the probe due to the error caused by the packet loss and its propagation. An example of the derivation of the error propagation maps is depicted in FIG. 4.

Figure 4:
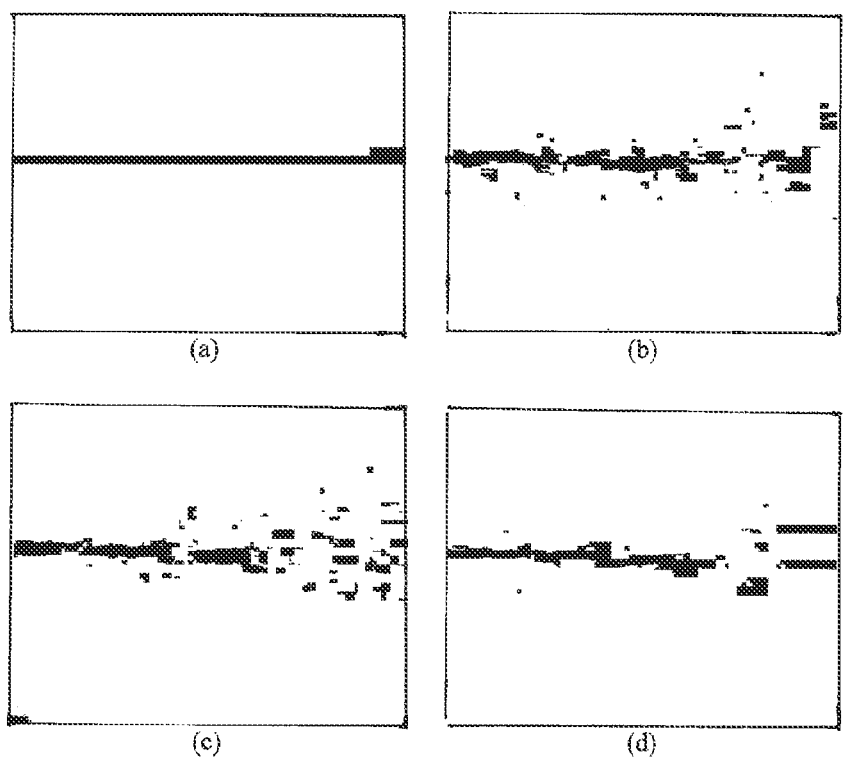
FIG. 4 shows the error propagation maps for four consecutive frames in the video sequence.

FIG. 4 depicts the error propagation maps for four consecutive frames in the video sequence to demonstrate how the initial error caused by a packet loss spreads into the following frames that reference the initial frame for their prediction. In particular, in FIG. 4a, the dark region corresponds to the area that cannot be decoded because the information for these pixels was contained in a packet which was erased. As a result, the decoder needs to conceal (usually using temporal or spatial neighbors) this area to replace the missing pixels. Since the concealment can not recover the original information exactly, some degradation is introduced to that frames. FIGS. 4b, 4c, and 4d show how this error propagates into the following frames. Dark areas correspond to pixels that reference information from the initially lost (and concealed) region and are thus prone to be erroneous as well.

The packet loss occurs in the first frame (the dark area in the figure denotes the macroblocks that have been erased due to the packet loss) and propagates to the subsequent frames that reference the affected area of the first frame for the prediction process. It is noted that in alternative embodiments the error propagation map may be estimated at the macroblock level, meaning that propagation is tracked for every macroblock instead for every pixel.

Based on the error propagation maps, the total number of impaired pixels due to a packet loss, called ErrProp, is computed as:

$$ErrProp = \sum_{k=1}^{K} \sum_{x=1}^{H} \sum_{y}^{W} I(x, y, k) \quad \text{Eq. (6)}$$

Finally, another feature may be extracted based on the motion vectors, the macroblock types and the residuals, termed EstErr, to quantify the magnitude of the distortion induced due to the packet loss and due to error propagation which enables the estimation of the induced mean squared error (MSE) in a no-reference manner. The method for estimating the induced distortion is out of scope of this invention, thus any method known to the skilled person could be used, for example the method proposed in M. Naccari, M. Tagliasacchi, and S. Tubaro, "No-reference video quality monitoring for H.264/AVC coded video," IEEE Trans. on Multimedia, vol. 11, no. 5, pp. 932-946, August 2009.

In the shown example, the aforementioned eight features are extracted for every packet loss that occurs in a GOP. When more than one packet loss appear in the same GOP, then in the preferred embodiment the maximum value is selected for the ErrorDur, and MaxPartNr, while for the other features their sum is considered as the final features. However, in other embodiments, the features extracted from every packet loss within a GOP can be combined differently, for example by computing the mean, the median, or any other function. Thus, within every GOP, the following feature vector is extracted which is used for the estimation of the visibility of packet loss events:

$$f = [ErrDur, AvgMV, AvgMvDiff, ResEnergy, MaxPartNr, LostMbs, ErrProp, EstErr] \quad \text{Eq. (7)}$$

It will be appreciated that in other embodiments of the present invention, any number and combination of the aforementioned features could be used. This is mainly meaningful when it is desired not to compute some features (e.g., due to complexity reasons or cost implementation).

Continuous Estimate of Packet Loss Visibility Using Support Vector Regression

For the classification of packet loss visibility based on the extracted features of each packet loss event, a technique based on Support Vector Regression (SVR) is employed. With this method, the input feature vector is mapped to a high-dimensional feature space using a non-linear mapping function and then a linear model is constructed in this feature space. The algorithm operates in two stages: the training stage in which the training data are used to tune the parameters of the model, and the evaluation stage in which the model outputs the predicted value for the input feature vector. These two stages are described in detail in the following.

In the training stage, a set of n training data, denoted by $\{(f_1, y_1), (f_2, y_2), \ldots, (f_n, y_n)\}, f_i \in \Re^8, y_i \in \Re, i=1, \ldots, n$, where $f_i$ is a feature vector described in Eq. (7), and $y_i$ is the target output value, is used to estimate the model parameters that maximize its prediction accuracy. It will be appreciated that any method for training known to the skilled person could be used. The outcome of the training algorithm with the input training data results in the computation of a set of parameters, $\alpha_i, i=1, \ldots, n, \beta_i, i=1, \ldots n$, and $b \in \Re$, which are used during the evaluation stage. In the present invention the value of b is selected to be equal to 1.27. However, any other value could be used.

At the evaluation stage, the algorithm receives an input feature vector f (as described in Eq. (7)) and the predicted value of the visibility of each loss, V, is given by:

$$V(f) = \sum_{i=1}^{n} (\alpha_i - \beta_i) K(f, f_i) + b \quad \text{Eq. (8)}$$

where $K(\bullet, \bullet)$ is the kernel function, and $f_i, i=1, \ldots, n$, are the feature vectors used as training data. In the present invention, the following function has been selected as the kernel function, which is also known as the Radial Basis Function (RBF):

$$K(f, f_i) = e^{-\frac{\|f - f_i\|^2}{\gamma}} \quad \text{Eq. (9)}$$

In the present invention, the value of γ is selected to be equal to 2. Also, any other kernel function could be used in other embodiments. Furthermore, the predicted value V for the visibility of a packet loss can be converted into a binary value, if it is desirable to classify a packet loss into one of the following two cases: visible or invisible. In that case, the binary predicted value of a packet loss, denoted as $V_B$, can be computed as:

$$V_B = \begin{cases} 0, & \text{if } V < T \\ 1, & \text{if } V \geq T \end{cases} \quad \text{Eq. (10)}$$

where T is a threshold value to classify the continuous estimate of packet loss visibility in a binary value. Within the present invention, the suggested value is 0.7, but any other value could be used.

When the algorithm operates at the evaluation stage only and does not need to train on new data, the stored parameters are used and the visibility V of each packet loss event is predicted as defined in Eq. (8). The extracted features that were mentioned above are refined so that they reflect the predicted value of the visibility of each packet loss and are weighted accordingly, as analyzed in the following section.

Video Quality Assessment Method

The proposed bit stream based video quality assessment model is a combination of the degradation caused by the compression of the video sequences, $Q_{cod}$, and the quality degradation due to packet loss during transmission ($Q_{trans}$). Thus, the overall quality is given by:

$$Q = Q_0 - Q_{cod} - Q_{trans} \quad \text{Eq. (11)}$$

where Q denotes the overall quality of the sequence and $Q_0$ denotes the source quality of the video inserted in the transmission chain. The $Q_{cod}$ term is computed by:

$$Q_{cod} = a_1 \cdot e^{a_2 B} + a_3 \quad \text{Eq. (12)}$$

where B is the bit rate of the video sequence, and $a_1$, $a_2$, and $a_3$ are constants. In the present example, the values of $a_1$, $a_2$, and $a_3$ are selected equal to 89.33, −1.21, and 11.47.

The channel-induced visual degradation term reflects the distortion that is caused by the packet loss, the extent of its propagation and the intensity in human visual perception. For this reason, the following formula is used for $Q_{trans}$:

$$Q_{trans} = f(V_i, \text{EstErr}_i, \text{ErrProp}_i) \quad \text{Eq. (13)}$$

Here, the index i is used to denote a particular single packet loss event that occurs during the sequence and $f(\bullet,\bullet)$ represents any suitable function. In other words, the overall degradation due to transmission errors is a function of the visibility of every packet loss, the error that is induced to the frame where the packet loss occurs and the propagation of the error into the subsequent frames.

In the following, two embodiments of the present invention are presented to represent the function $f(\bullet,\bullet)$ mentioned above with specific formulas.

In the first embodiment, Eq. (13) is rewritten as:

$$Q_{trans} = a_4 \cdot \sum_i V_i \cdot \text{EstErr}_i + a_5 \sum_i V_i \cdot \text{ErrProp}_i + a_6 \cdot \sum_i V_i \cdot \text{EstErr}_i \cdot \text{ErrProp}_i \quad \text{Eq. (14)}$$

where $a_4$, $a_5$, and $a_6$ are constants determined by regression, i is an index referring to every individual packet loss, $\text{EstErr}_i$ and $\text{ErrProp}_i$ are the extracted features as mentioned above associated with each packet loss. Thus, the model takes into account the importance of each packet loss for the determination of the visual degradation and utilizes the output of the visibility estimation to weight the induced distortion of every packet loss. In the present embodiment, the values of $a_4$, $a_5$, and $a_6$ are selected equal to 0.023, 0.000176, and 0.0000465.

Figure 5:
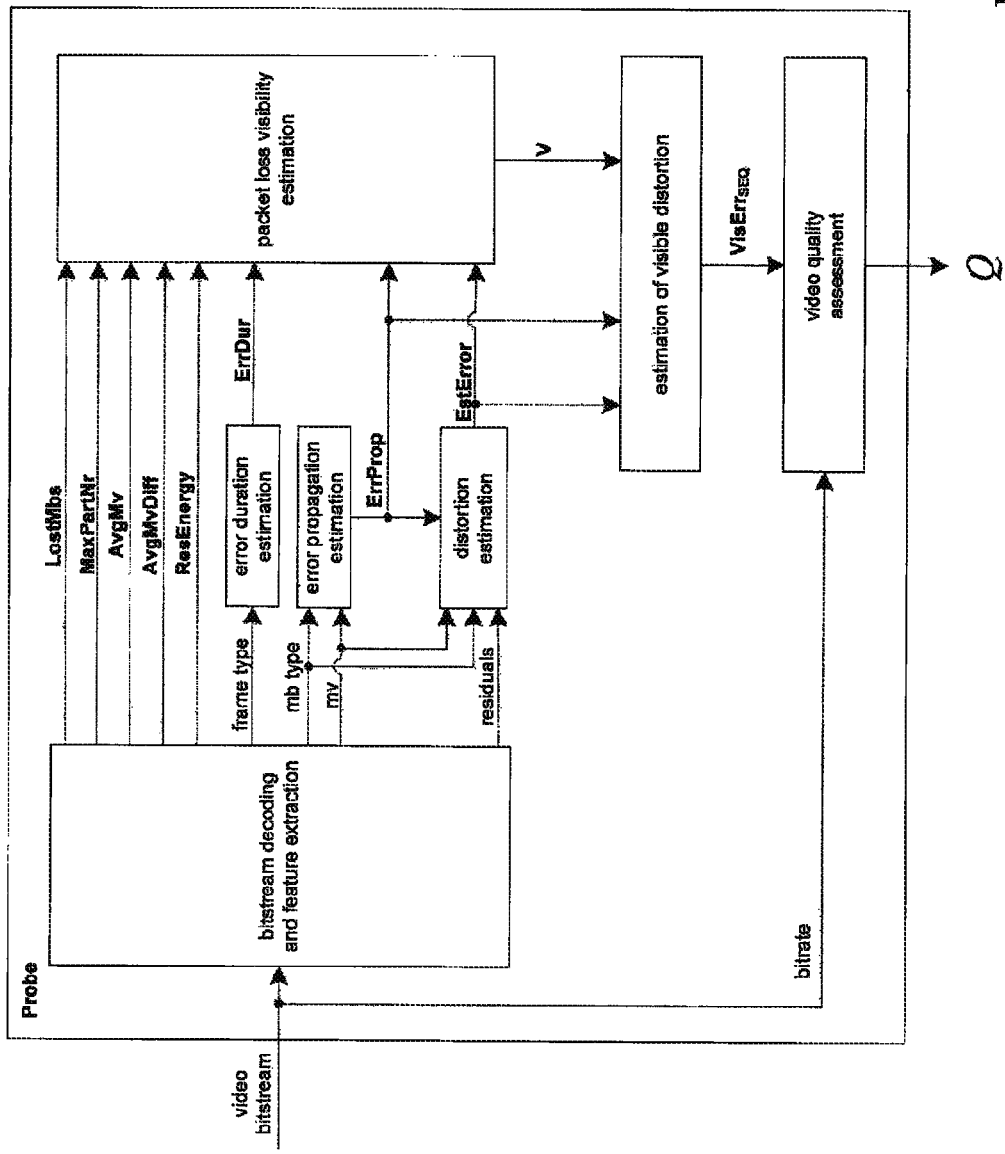
FIG. 5 depicts a block diagram of a second embodiment of the present invention for the assessment of video quality.

In a second embodiment, which is depicted in FIG. 5, another implementation is employed for the function $f(\bullet,\bullet)$ of Eq. (14). Let i denote the index of an individual packet loss occurring within a GOP. Also, let $\text{EstErr}_i$ be the induced distortion in the frame where the i-th packet loss occurred, estimated as explained above in the feature extraction section. Then, the visible degradation associated with this packet loss is given by:

$$\text{VisEstErr}_0^i = V_i \cdot \text{EstErr}_i \quad \text{Eq. (15)}$$

Also, let $\text{NrImpPx}_k^i$ denote the number of impaired pixels in frame k caused by the i-th packet loss, or equivalently $$\text{NrImpPx}_k^i = \sum_{x=1}^{H} \sum_{y=1}^{W} I(x, y, k) \quad \text{Eq. (16)}$$

where I(x,y,k) denotes the value of the binary error map at location (x,y) of the k-th frame, x=1, 2, . . . , H, and y=1, 2, . . . , W where H, W are the height and width of each frame of the video sequence, respectively. Then, the perceived degradation in the subsequent frame k, k>0, due to error propagation of the i-th packet loss is given by:

$$\text{VisEstErr}_k^i = \text{VisEstErr}_0^i \cdot \frac{\text{NrImpPx}_k^i}{\text{NrImpPx}_0^i} \quad \text{Eq. (17)}$$

Figure 6:
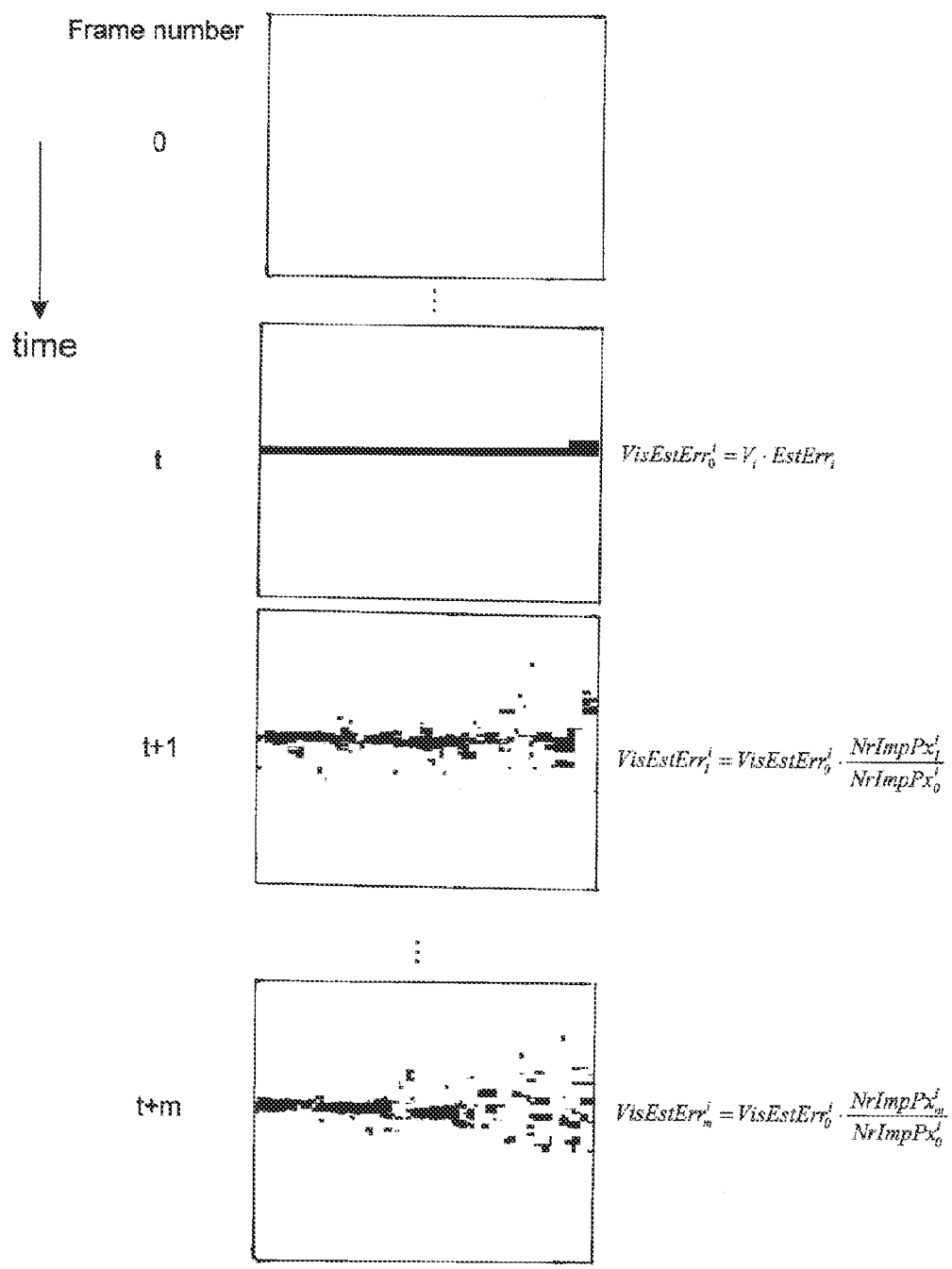
FIG. 6 depicts an example for the estimation of the induced visible distortion due to packet loss(es) in the frames of a video sequence.

Here, $\text{NrImpPx}_0^i$ is the number of impaired pixels caused by the innovation error (the error in the first frame which was affected by the packet loss under consideration) due to packet loss event i, which is given the relative frame-index k=0. An example of the computation of the term $\text{VisEstErr}_k^i$ for the subsequent frames with index k, is depicted in FIG. 6. In this figure, the dark area in frame with index t corresponds to the term $\text{NrImpPx}_0^i$, while the dark area in the subsequent frames (indeces t+1, . . . , t+m) correspond to the terms $\text{NrImpPx}_k^i$, k=1, . . . m.

Then, the overall visual degradation caused by the i-th packet loss, termed $\text{VisEstErr}^i$, can be considered as the summation of the degradations caused to all the frames $K_i$ that were impaired due to this packet loss, thus:

$$\text{VisEstErr}^i = \sum_{k=0}^{K_i} \text{VisEstErr}_k^i \quad \text{Eq. (18)}$$

Note that the summation starts from the index zero to factor in the initial distortion as described in Eq. (15). The total distortion within a specific GOP is computed as the summation of the distortions generated by all packet losses occurring within this GOP, thus:

$$\text{VisEstErr}_{GOP} = \sum_i \text{VisEstErr}^i \quad \text{Eq. (19)}$$

Finally, let G denote the total number of GOPs within a sequence, and T denote the total duration of the sequence. Then, the overall distortion due to transmission errors is given by:

$$VisErr_{SEQ} = \frac{1}{T}\sum_{g=1}^{G} VisEstErr_{GOP} \qquad \text{Eq. (20)}$$

$$Q_{trans} = f(VisErr_{SEQ}) \qquad \text{Eq. (21)}$$

In the preferred embodiment of this second type, we set $$Q_{trans} = \theta \cdot \log(\xi \cdot VisErr_{SEQ} + 1) \qquad \text{Eq. (22)}$$

Where $\theta$ and $\xi$ are constants that are, for example, determined in a regression procedure using quality ratings as target values.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

Furthermore, in the claims the word "comprising" does not exclude other elements or steps. A single unit may fulfil the functions of several features recited in the claims. Any reference signs in the claims should not be construed as limiting the scope.

The invention claimed is:

1. A method for assessing the quality of a transmitted video signal sequence at a receiver side, the method comprising the steps of:
   a) capturing the input video bit stream and supplying it to a video bit stream analyzer;
   b) extracting at least one feature or a set of features from the captured input video bit stream by the bit stream analyzer;
   c) supplying the at least one extracted feature or set of features to a packet loss visibility estimation module;
   d) determining, by the packet loss visibility estimation module employing the supplied extracted features of the video bit stream, a continuous probability of visibility for each packet loss event which occurred within a specific time interval; and
   e) employing the continuous probability of packet loss visibility, determined by the packet loss visibility estimation module, as a weighting factor of the at least one feature or set of features extracted from the video bit stream to calculate an estimate of the overall quality, Q, of the transmitted video sequence;
   wherein step (d) employs at least one bit stream feature selected from a group consisting of: frame type, average magnitude of motion vectors (AvgMv), average motion vector difference (AvgMvDiff), energy of residuals (ResEnergy), maximum number of partitions (MaxPartNr), number of non-decodable macroblocks (LostMbs), motion vector information (mv), and type of macroblocks (mb type);
   wherein step (e) combines a packet loss visibility estimate (V) with a determined magnitude of distortion (EstErr) and a computed total number of impaired pixels due to packet loss (ErrProp);
   wherein the packet loss visibility estimate (V) is based on one or more of the bit stream features;
   wherein the determined magnitude of distortion (EstErr) is based on one or more of the bit stream features; and
   wherein the computed total number of impaired pixels due to packet loss (ErrProp) is based on one or more of the bit stream features.

2. The method of claim 1, wherein feature extraction according to step (b) is performed directly by partly decoding the video bit stream, where "partly" means without decoding the bit stream to the pixel level.

3. The method of claim 1, wherein feature extraction according to step (b) is performed by full decoding of the video bit stream and by combining information from the reconstructed pixels of the video signal.

4. The method of claim 1, wherein based on the extracted feature "frame type" a number of frames (ErrDur) degraded by a packet loss is determined and used for the prediction of the probability of packet loss visibility as well as for combining it with the visibility probability to estimate the impact of packet loss on visual quality.

5. The method of claim 1, wherein a binary error propagation map is generated for each picture of the video signal sequence based on the motion vector information and the type of macroblocks.

6. The method of claim 1, wherein based on an error propagation map and frame type information the number of frames (ErrDur) degraded by a packet loss is determined.

7. The method of claim 5, wherein based on the binary error propagation map the total number of impaired pixels due to packet loss (ErrProp) is computed.

8. The method of claim 1, wherein a magnitude of distortion (EstErr) induced due to packet loss and error propagation is determined based on the motion vectors, the macroblock types, and the residuals.

9. The method of claim 1, wherein step (d) is performed using a support vector regression technique by mapping the input feature vector, comprised from the aforementioned features, to a high-dimensional feature space using a nonlinear mapping function, and constructing a linear model in the feature space.

10. The method of claim 1, further comprising between steps d) and e) the step of:
   estimating an overall visible distortion generated by temporal pooling of all packet losses occurring within the video signal sequence.

11. An apparatus for assessing the quality of a transmitted video signal sequence at a receiver side, the apparatus comprising:
   a video bit stream analyzer for receiving the captured input video bit stream, and configured for extracting at least one feature or a set of features from the captured input video bit stream;
   a packet loss visibility estimation module for receiving the extracted feature or set of features, the packet loss visibility estimation module configured for determining the visibility of a packet loss that occurred during transmission of the video signal by predicting a continuous probability of visibility for each packet loss event occurred within a specific time interval; and a combiner for combining the probability of packet loss visibility, determined by the packet loss visibility module, as a weighting factor of the at least one feature or set of features extracted from the video bit stream to calculate an estimate of the overall quality, Q, of the transmitted video signal sequence;

wherein the packet loss visibility estimation module is configured to employ at least one bit stream feature selected from a group consisting of: frame type, average magnitude of motion vectors (AvgMv), average motion vector difference (AvgMvDiff), energy of residuals (ResEnergy), maximum number of partitions (MaxPartNr), number of non-decodable macroblocks (LostMbs), motion vector information (mv), and type of macroblocks (mb type);

wherein the combiner is configured to combine a packet loss visibility estimate (V) with a determined magnitude of distortion (EstErr) and a computed total number of impaired pixels due to packet loss (ErrProp);

wherein the packet loss visibility estimate (V) is based on one or more of the bit stream features;

wherein the determined magnitude of distortion (EstErr) is based on one or more of the bit stream features; and wherein the computed total number of impaired pixels due to packet loss (ErrProp) is based on one or more of the bit stream features.

* * * * *